United States Patent [19]

Katagiri et al.

[11] 4,416,188
[45] Nov. 22, 1983

[54] BRAKE BOOSTER

[75] Inventors: Masayoshi Katagiri; Takashi Fujii, both of Toyota; Osamu Ogura, Nagoya, all of Japan

[73] Assignees: Toyota Jidosha Kogyo Kabushiki Kaisha; Aisin Seiki Kabushiki Kaisha, both of Aichi, Japan

[21] Appl. No.: 265,224

[22] Filed: May 19, 1981

[30] Foreign Application Priority Data

May 26, 1980 [JP] Japan .............................. 55-72379[U]
May 27, 1980 [JP] Japan .............................. 55-72859[U]

[51] Int. Cl.³ .............................................. F15B 9/10
[52] U.S. Cl. ................................ 91/369 B; 91/369 A; 91/374
[58] Field of Search ............. 91/369 B, 369 A, 369 R, 91/374

[56] References Cited

U.S. PATENT DOCUMENTS 4,283,911 8/1981 Nakamura ......................... 91/369 B
4,287,811 9/1981 Katagiri et al. .................... 91/369 B
4,366,744 1/1983 Katagiri et al. .................... 91/369 B

FOREIGN PATENT DOCUMENTS 2071241 9/1981 United Kingdom .............. 91/369 B

Primary Examiner—Paul E. Maslousky
Attorney, Agent, or Firm—Parkhurst & Oliff

[57] ABSTRACT

A brake booster of the stroke-enlarging type which includes a power piston disposed in a casing for being actuated by a difference in pressure on opposite sides thereof. The brake booster includes a transmission device in the form of a ball and ball retainer which are biased by a spring while the ball is retained between a surface of the power piston and a control piston. The ball and ball retainer are limited in movement by a stopper coupled to the power piston. The ball and ball retainer forming the transmission device are advanced in response to the spring bias by the power piston and are operated such that when a brake clearance has been extinguished and a reactionary force from the output member becomes larger than the preload of the spring, the reactionary force blocks the advance of the ball and ball retainer so that the reaction force is partly transmitted to the control piston with a resultant reduction of the reactionary force transmitted to the power piston.

10 Claims, 9 Drawing Figures

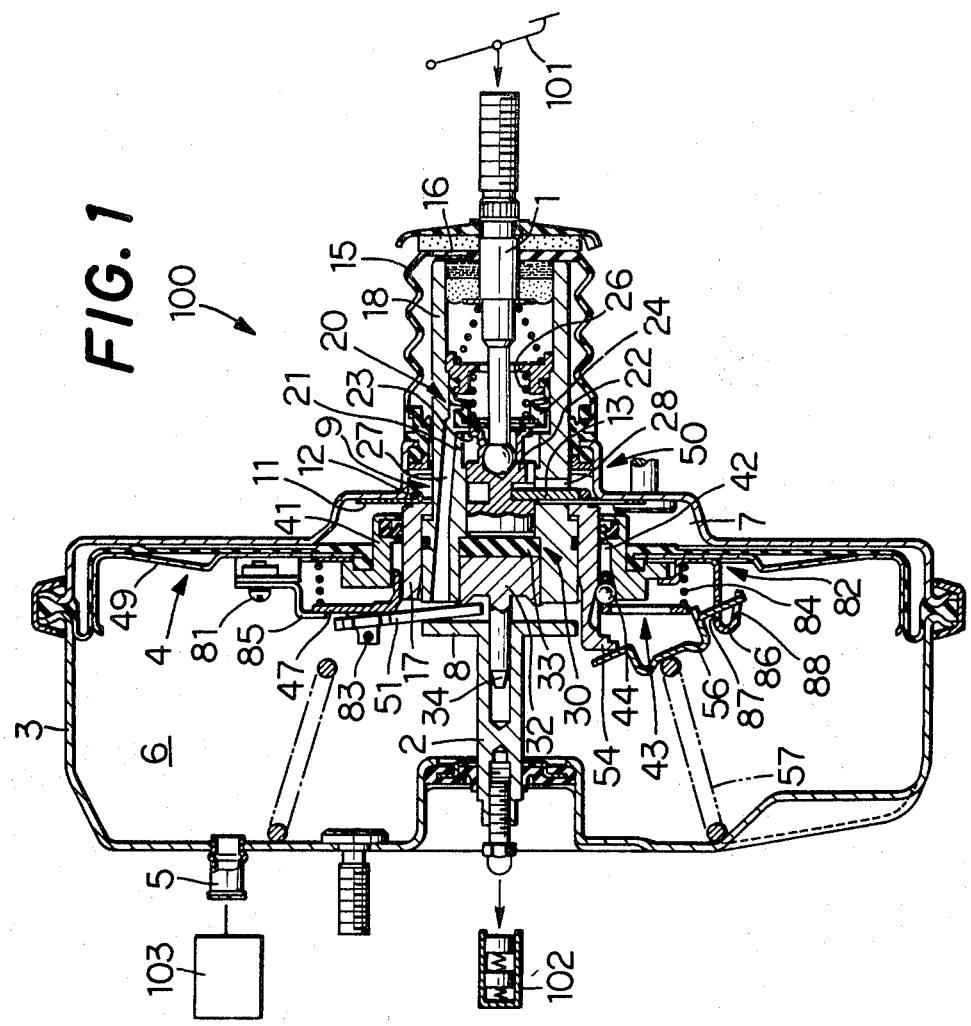
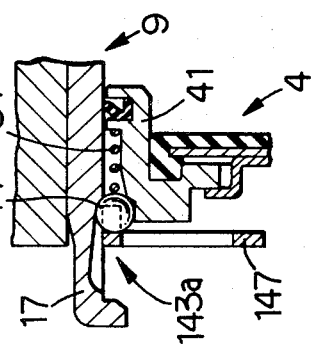
FIG. 1
FIG. 9

BRAKE BOOSTER

BACKGROUND OF THE INVENTION

This invention relates to a brake booster for boosting brake operational force by utilizing gaseous pressure, and more particularly to an improvement of a brake booster of stroke-enlarging type.

A stroke-enlarging type brake booster herewith referred to is a brake booster in which a power piston disposed in a booster casing in such a state as to divide the interior thereof into two chambers for being actuated by the pressure difference in those two chambers is made relatively movable to a control piston having a control valve or a valve mechanism for controlling the above-mentioned pressure difference due to operation of an input member and a transmission mechanism for transmitting the operational force applied on the input member toward an output member, whereby increasing of a stroke at the output member is attempted by the relative movement of the power piston to the control piston. A booster of this type is characterized in producing a larger output stroke than the input stroke applied, while the output stroke is the same as the input stroke or less in ordinary boosters. A brake booster of stroke-enlarging type has been conventionally somewhat defective in rapidly increasing only the pedal stroke, an input stroke, without increasing the braking force at all at a critical point, which corresponds to an upper limit of an assisting force applied on the power piston by the pressure difference on either side of the power piston.

The applicants of this invention developed some time ago a brake booster, for eliminating the above-mentioned disadvantage, having a highly reliable anti-backdown mechanism capable of effectively preventing the retracting of the power piston at the critical point, while being simple in structure and sure in keeping away delay in action. This brake booster having eliminated the troublesome idle stroke and the resultant brake feeling deterioration was filed as a patent application in the United States with the application No. 223,565, now U.S. Pat. No. 4,387,625. This anti-backdown mechanism includes a plurality of balls rotatably held by a ball retainer and disposed between the power piston and the control piston. A ball accommodating recess is formed on the external surface of the control piston. The bottom surface of the recess is made so slant as to gradually approach the axis of the control piston along the forward direction. A ball driving surface is formed on the internal surface of the power piston. The ball driving surface is made so slant as to depart from the axis of the power piston along the forward direction for being able to advance the balls forwardly. A part of the ball driving surface where the same is contacted with the balls when the power piston is farthest advanced relative to the control piston is made more gently slope than the rest part thereof. The forward end of the ball retainer abuts on a first input portion of a reaction lever, whereby the output force of the power piston is transmitted via the balls and the ball retainer to the reaction lever and the reactionary force transmitted from the output member via the reaction lever to the ball retainer is, when the power piston is at the farthest position, is transmitted to both the control piston and the power piston through an engagement between the balls and the bottom surface of the ball accommodating recess and the gentle slope portion of the ball driving surface.

This type of the brake booster is, owing to its structure, effective in its output stroke enlarging function until the power piston is locked on the control piston upon having reached its farthest position. Due to lack of uniformity of clearance in the brake which is connected to the output member, possible premature extinction of the brake clearance which may happen prior to reaching of the power piston to the farthest position will cause a strong brake operation exceeding the expectation or wish of the driver because of the continued stroke enlarging effect. An attempted design of a booster making the power piston reach the farthest position when the smallest expected brake clearance has disappeared turned out unsuccessful, because the brake clearance remained unvanished in ordinary cases even after termination of the output stroke enlarging action. It hindered satisfactory enjoyment of the output stroke enlarging effect, contrary to the expectation.

SUMMARY OF THE INVENTION

This invention was made from such a background. It is therefore a primary object of this invention to provide a brake booster in which the output stroke enlarging action is executed only while diminishing of the brake clearance progresses and the power piston and the control piston are locked at a position where the output stroke enlarging action is terminated.

A brake booster in accordance with this invention is, for achieving this object, provided with (1) an input member, (2) an output member, (3) a power piston disposed in a booster casing in such a state as to divide the interior thereof into two chambers for being actuated by the pressure difference in those two chambers, (4) a control piston axially movably fitted in a center bore of the power piston and provided with a built-in control valve for controlling the above-mentioned pressure difference and a first transmission device for transmitting operational force applied on the input member toward the output member, (5) a reaction lever, which is abutted on the output member at a central output portion thereof, receiving output force of the power piston and output force of the transmission mechanism at a first input portion and a second input portion respectively located on either side of the central output portion, for producing a larger stroke at the output member than at the input member, (6) a second transmission device relatively axially movably disposed to both pistons in a space formed between the internal surface of the power piston and the external surface of the control piston for transmitting the output force of the power piston to the first input portion of the reaction lever, (7) stopper means for limiting the relative advancing of the second transmission device to the power piston, (8) biasing means for urging the second transmission device by a predetermined resilient force on to the stopper means, and (9) the second transmission device relatively non-movably connecting the power piston and the control piston through concurrent engagement with both pistons, when reactionary force from the reaction lever becomes larger than the predetermined resilient force in response to the advancing of the power piston.

In such a structure of the brake booster, the power piston and the control piston are locked together, even if there is an ununiformity of the brake clearance to some extent, when the clearance has been extinguished. The braking operational force at this time is a very small one in correspondence to the biasing force which is equilibrated with the reactionary force of that small braking operational force. A strong braking action against the driver's will can thus be prevented. Since the second transmission device is constantly biased to the side of the output member due to the action of the biasing means, there is no fear of locking between the power piston and the control piston to take place when the stroke enlarging operation is under progress, which completely eliminates the disadvantages inherent to the brake booster disclosed in U.S. patent application No. 223,565.

In a preferred embodiment of this invention the second transmission device includes at least one ball and a ball retainer movably retaining the ball in a radial direction; a wedge shaped space is so formed between the internal surface of the power piston and the external surface of the control piston as to be gradually wider in the forward direction, and the non-movable connection of the power piston and the control piston is executed through fixed locking of the ball in the wedge shaped space.

It is another object of this invention to provide a brake booster wherein stroke loss on the power piston when the locking operation is effectuated can be eliminated and operation noise can be prevented at the same time. For achieving this object, the second transmission device is constructed such that the ball is retained by the ball retainer without clearance but radially movably with the aid of the biasing means.

BRIEF DESCRIPTION OF THE DRAWING

FIG. 1 is an axial section of a first embodiment of a brake booster in accordance with this invention;

FIG. 9 is an enlarged axial section of an essential part of a fifth embodiment of the brake booster.

DETAILED DESCRIPTION OF A PREFERRED EMBODIMENT

Figure 2:
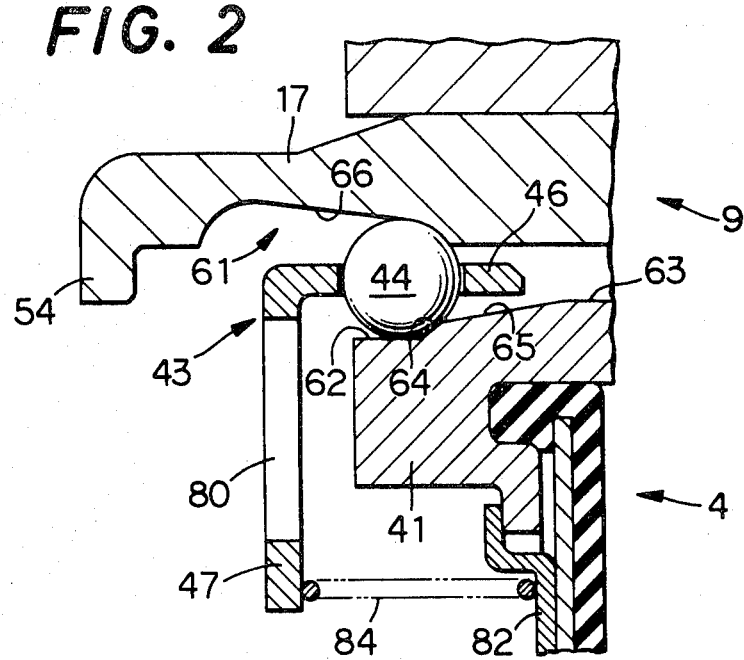
FIG. 2 is an enlargement of an essential part in FIG. 1.

For the purpose of further clarifying the objects, structure, and effect of this invention preferred embodiments will be described with reference to the attached drawing hereunder.

A booster 100 shown in FIG. 1 is to boost an input force applied to an operating rod 1, an input member, before transmitting the same from a push rod 2, an output member, to a master cylinder 102.

The booster 100 is provided with an air tight casing 3, whose internal area is divided into two chambers by a power piston 4 of diaphragm type. The power piston 4 is provided with a main body 49, an annular member 82 secured to the main body 49 with three of screws 81, and another annular member 41 fixedly held in the central portion of the annular member 82. One of the two chambers divided by the power piston 4 constitutes a constant pressure chamber which is under negative pressure, being connected to a vacuum source 103 such as an intake manifold of an engine or a vacuum pump by way of a pipe joint 5. The other chamber is a variable pressure chamber 7 which is variable in pressure by being selectively communicated to the constant pressure chamber 6 or the ambient atmosphere by a later described control valve.

In the central portion of the power piston 4 a control mechanism 50 consisting of a control valve 20 and a first transmission device 30 is disposed. In the power piston 4 a control piston 9, which constitutes a main body of the control mechanism 50, is slidably fitted. The control piston consists of a main body 18 and a cylindrical annular member 17 fitted on the outside of the former. The control valve 20 is composed of a first valve seat 21 formed on the control piston 9, a second valve seat 23 formed on a valve plunger 22 slidably fitted in the control piston 9, and a valve element 24 of elastic material disposed commonly to those two valve seats 21, 23. The valve element 24 is biased to both valve seats 21, 23 by the action of a compression spring 26. In the control piston 9 a respective air inlet passage 27 and 28 communicated to the constant pressure chamber 6 and the variable pressure chamber 7 are formed. In a groove formed in communication with the air inlet passage 28 and wider than that, a stopper 13 is inserted to restrict the advancing end and the retracting end of the valve plunger 22. The stopper 13 also secures the stopper plate 11 which is abuttable on the rear wall of the casing 3 for restricting the retracting end of the control piston 9. The stopper 13 is prevented from being got rid of the inserted place by an annular spring 12. A projecting portion of the control piston 9 from the casing 3 is completely covered by a boot 15, whose end portion is provided with an air inlet port 16.

On the other hand, the first transmission device 30 includes the valve plunger 22 fixed on the tip of the operating rod 1, a large plunger 32 fitted into the control piston 9, and a reaction disc 33 of rubber interposed between the valve plunger 22 and the large plunger 32. The reaction disc 33 functions, while allowing a slight relative movement of the valve plunger 22 and the control piston 9, to transmit the resultant force applied from the both to the large plunger 32. The large plunger 32 is provided with a rod portion 34 projecting from the central part thereof for retaining the rear end of the push rod 2.

A circumferential clearance or gap 42 is formed between the power piston 4 and the control piston 9, wherein a ball retainer 43 rotatably retaining a plurality of balls (three in this embodiment) 44 is accommodated. Those balls 44 and the ball retainer 43 constitute a second transmission device.

As shown in FIG. 2, on the external peripheral surface of the cylindrical annular member 17 a groove like ball accommodating recess 61 is formed in the axial direction of the cylindrical annular member 17, having a slope surface 66 gradually becoming deeper toward the forward end thereof (leftward in the figure), that is becoming nearer to the axis of the control piston 9. On the other hand the annular member 41 is provided with on the internal peripheral surface thereof biased to the forward side a groove like recess located face to face the ball accommodating recess 61, having a parallel surface portion 62 parallel to the axis of the power piston 4 on the forwardmost, a steep slope surface portion 64 slant so as to gradually approach the axis of the power piston 4 in the rearward direction, and a gentle slope surface portion 65 continued from the steep slope surface portion 64 in the further rearward direction. This gentle slope surface portion 65 functions as a locking surface for the ball 44. This recess and the ball accommodating recess 61 are respectively of a crescent shape with a radius of curvature equal to or slightly larger than the radius of the ball 44. Numeral 63 designates a small internal diametered portion.

The ball retainer 43 is composed of, as clearly shown in FIG. 2, a cylindrical annular portion 46 of thin wall and three of abutting flanges 47 formed outwardly at right angle. In the respective abutting flange 47 an opening 80 is formed such that the annular member 41 may not contact thereto when the power piston 4 is relatively advanced to the control piston 9, and three sets of lever retaining portions 83, respectively a pair of retaining projections for a reaction lever 51 formed by bending a portion of the abutting flange 47, are disposed as shown in FIG. 1 at a symmetrical position respectively to the opening 80 about the piston axis. Between the abutting flange 47 and the annular member 82 a compression coil spring 84 is coaxially disposed for constantly biasing the ball retainer 43 forwardly, which is however blocked of advancing by three stoppers 85 of L-shape which are disposed in a centrally directed posture from each of the three screw fixed portions of the annular member 82 to the main body 49 of the power piston 4. On the annular member 82 three retaining portions 86 of U-shape are integrally formed, at an axially symmetrical position to the screw fixed portion, which have an opening 87 and a recess 88 for positioning a spring receiver 56. Between the abutting flanges 47 and the large plunger 32, and a reaction plate 8 on the rear end of the push rod 2 faced to the former two members three reaction levers 51 are interposed, which is respectively on one end thereof engaged with the lever retaining portion 83 and prevented by a split pin from comming out of the place. The reaction lever 51 is an elongated plate member provided with on both sides respectively a pair of projections. Each pair of projections of the lever retaining portions 83 are positioned on both sides of the reaction lever 51, and each pair of projections formed on both sides of the reaction lever 51 are positioned on both sides of one of each pair of projections of the lever retaining portions. The cylindrical annular member 17 is provided on the front end thereof with three flanges 54. In the middle portion of a spring receiver 56, which is at one end thereof in contact with the flange 54 and at the other end thereof pierced through the opening 87 formed in the retaining portion 86 for being engaged with the recess 88 formed on the end of the retaining portion 86, and the front wall of the casing 3 at a faced position to the spring receiver 56 a compression coil spring 57 is coaxially disposed.

The operation mode of this embodiment will be explained hereunder. In a state of non-depressing of a brake pedal 101, as shown in FIG. 1, the second valve seat 23 is in contact with the valve element 24 and the first valve seat 21 is thereoff. So the variable pressure chamber 7 is in communication with the constant pressure chamber 6 so as to maintain both chambers 6, 7 at an equal negative pressure, producing no pressure difference between either side of the power piston 4. Both the power piston 4 and the control piston 9 are under the biasing force from the spring 57 via the spring receiver 56, rendering the stopper plate 11 abutted on the casing 3. The control piston 9 is kept at the retracted position by the abutment of the stopper plate 11 on the casing 3 and the power piston 4 is kept at the retracted position by the abutment on the casing 3.

A slight depressing of the brake pedal 101 in this state, with a slight forward advancing of the operating rod 1 (leftward movement in FIG. 1), makes the first valve seat 21 contact the valve element 24 by removing the second valve seat 23 thereoff. The variable pressure chamber 7 will be consequently separated from the constant pressure chamber 6 to be in communication with the ambient atmosphere. Between the constant pressure chamber 6 and the variable pressure chamber 7, where the air comes in from outside, a pressure difference is naturally created so as to move the power piston 4 forwardly.

Figure 3:
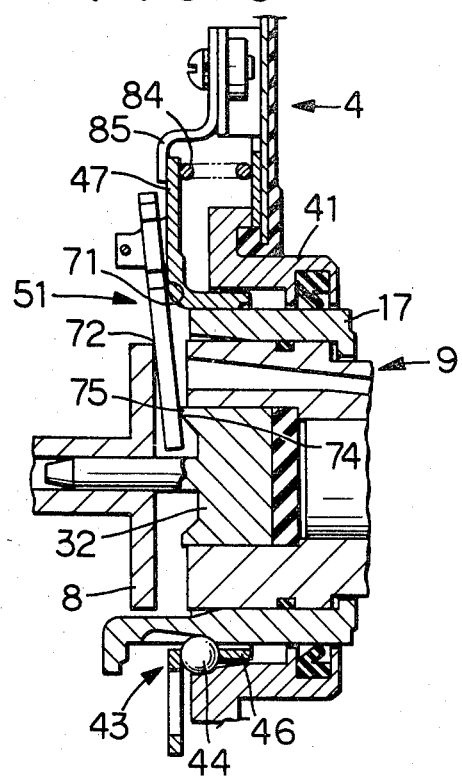
FIG. 3 is an enlargement of an essential part in FIG. 1.

At the time of advancing of the power piston 4 a force is transmitted to by way of the compression spring 84 the ball retainer 43, prior being applied to the ball 44 directly by the steep slope surface portion 64 of the annular member 41, for advancing the ball retainer 43. Advancing of the ball retainer 43 in this way applies a force on a first input portion 71 of the reaction lever 51, as shown in FIG. 3, which causes the reaction lever 51 to be rotated about a fulcrum, that is an output portion 75 of the large plunger 32 on which a second input portion of the reaction lever 51 is abutted. As a result of this a thrusting force is applied from an intermediate output portion 72 of the reaction lever 51 to the push rod 2 via the reaction plate 8. The brake fluid in the master cylinder 102 is supplied due to this thrusting force into a not shown braking circuit, which compensates at first the fluid amount consumed by the initial deformation of the piston cup or others after having taken away the brake clearance. It means that a much larger output stroke can be got than the input stroke applied.

Figure 4:
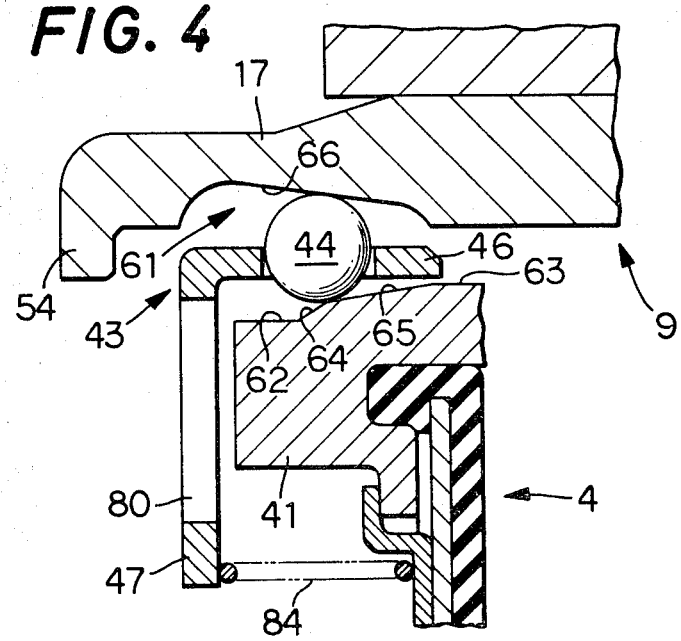
FIG. 4 is an explanatory view for showing the different operational state of the embodiment shown in FIG. 1 and FIG. 2.

When braking reactionary force begins to appear, upon extinction of the brake clearance, on the push rod 2 the reactionary force is transmitted by way of a reversed route of the earlier mentioned one, which blocks the advancing of the ball retainer 43. In other words, the preload of the compression spring 84 is being selected to be equal to the amount of the reactionary force at this time. Since the power piston 4 further advances against the resilient force of the compression spring 84, irrespective of the halting of the ball retainer 43 and the ball 44, the gentle slope surface portion 65 of the power piston 4 climbs up on the halted ball 44, as shown in FIG. 4, so as to lock the ball 44 in the wedge shaped space between the gentle slope surface portion 65 and the slope surface 66 of the ball accommodating recess 61. The power piston 4 becomes incapable of due to the locking of the ball 44 relatively advancing to the control piston 9, accompanied by a state of non-relative-movableness, neither forward nor rearward, of the ball 44 and the ball retainer 43. The slope surface 66 and the gentle slope surface portion 65 function as locking surfaces.

In this embodiment the power piston 4 and the control piston 9 are locked together, when the brake clearance has been extinguished, by the ball 44 and the stroke enlarging function is terminated by the action of the compression spring 84, so an unexpected strong braking operation against the driver's will caused by ununiformity of the brake clearance can be perfectly eliminated.

When the ball retainer 43 has become relatively non-movable to the control piston 9 and the gentle slope surface portion 65 of the power piston 4 has become to abut on the ball 44 retained by the ball retainer 43, the operating rod 1 and power piston 4 advance, just like in a conventional brake booster, the push rod 2 while the operating rod 1 and the power piston 4 share the load at the ratio determined by both of the reaction lever 51 and the reaction disc 33.

If the brake pedal 101 is, after the limit of the pressure difference on either side of the power piston has been reached, depressed strongly furthermore the second input portion 74 of the reaction lever 51 receives a major force from the output portion 75 of the large plunger 32 to cause the reaction lever 51 to be rotated, assuming the reaction plate 8 as the fulcrum on which the output portion 72 of the reaction lever 51 is abutted, so as to push the ball retainer 43 backwards. At this stage the ball retainer 43 is as mentioned earlier nonmovable in relation to the control piston 9, and the reactionary force from the push rod 2 toward the power piston 4 is divided by the reaction lever 51 into two, i.e., delivered to the large plunger 32 and the ball retainer 43. And the reactionary force transmitted to the power piston 4 will be only a component of the force delivered to the ball retainer 43 which is divided according to the angle ratio between the slope surface 66 and the gentle slope surface portion 65 locking the ball 44 therebetween. So the reactionary force applied on the power piston 4 will be further small. Even when a fairly large pedal depressing force is applied an idle stroke caused by a relative retraction of the power piston 4 to the control piston 9 can never occur on the brake pedal 101.

At this stage the valve plunger 22 is abutted on the stopper 13 to be restricted of its forward movement. After this abutment the operating rod 1, the valve plunger 22, the control piston 9, the large plunger 32, the reaction disc 33, the ball retainer 43, and the reaction lever 51 are all combined into an integral body to advance forward the push rod 2 via the reaction plate 8 as a mass of the integrated body. The output stroke is increased at this stage in a same amount as the input stroke. Since the assisting force to the power piston 4 has already reached the limit at this moment the output of the booster can never be increased beyond the increase of the brake operational force.

Upon releasing of the depression of the brake pedal 101, the valve element 24 comes to contact with the second valve seat 23, leaving the first valve seat 21, rendering the variable pressure chamber 7 closely sealed by means of its separation from the ambient atmosphere and placing the same in communication with the constant pressure chamber 6 instead. No assisting force is applied in this state on the power piston 4. So the power piston 4, the control piston 9, etc. are retracted under the biasing force from the spring 57 which comes by way of the spring receiver 56. This retraction makes the stopper plate 11 abut on the casing 3, bringing about halting of the retraction of the control piston 9, followed by relative retraction of the power piston 4 to the control piston 9. As the brake reactionary force applied to the ball retainer 43 is at this stage decreased with an accompanying decrease of the force locking the power piston 4 and the control piston 9, the power piston 4 can retract relative to the control piston 9. As a result of this, the ball 44 and the ball retainer 43 released of the locking are advanced due to the resilient force of the compression spring 84 as far as the ball retainer 43 abuts on the stopper portion 85. Retraction of the power piston 4 as far as it abuts on the casing 3 terminates one cycle of operation.

Figure 5:
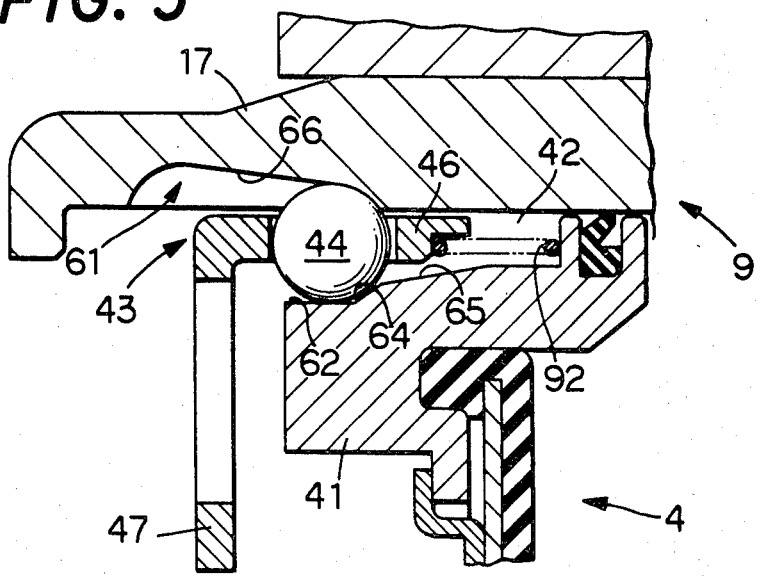
FIGS. 5 and 6 are respectively an enlargement of an essential part of a second and third embodiments of the brake booster.
Figure 6:
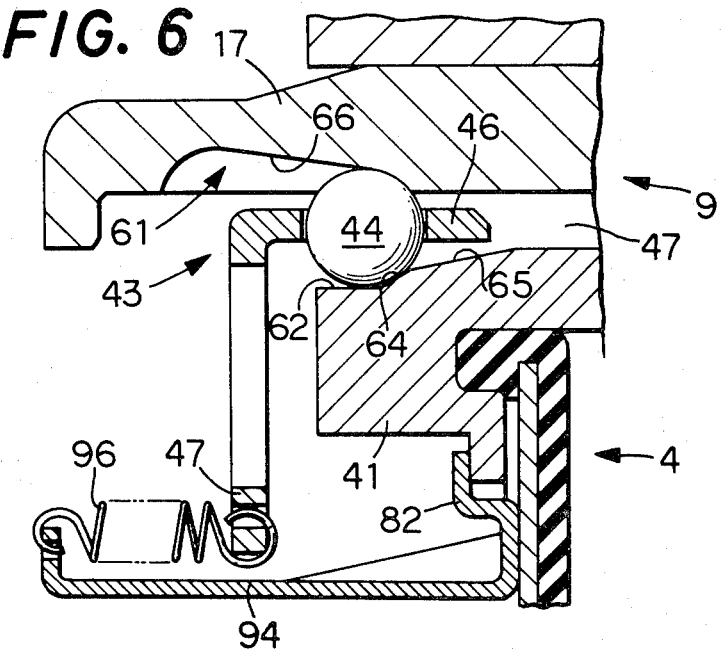

The means or structure for biasing the ball retainer 43 in advancing direction can be modified in various ways, for example, as shown in FIGS. 5 and 6. In the former a compression coil spring 92 is coaxially interposed between the cylindrical portion 46 of the ball retainer 43 and the annular member 41 within the space 42 formed between the cylindrical annular member 17 and the annular member 41, and in the latter case a tension coil spring 96 is interposed between a spring hook portion 94 integrally formed with the annular member 82 and the abutting flange 47.

Figure 7:
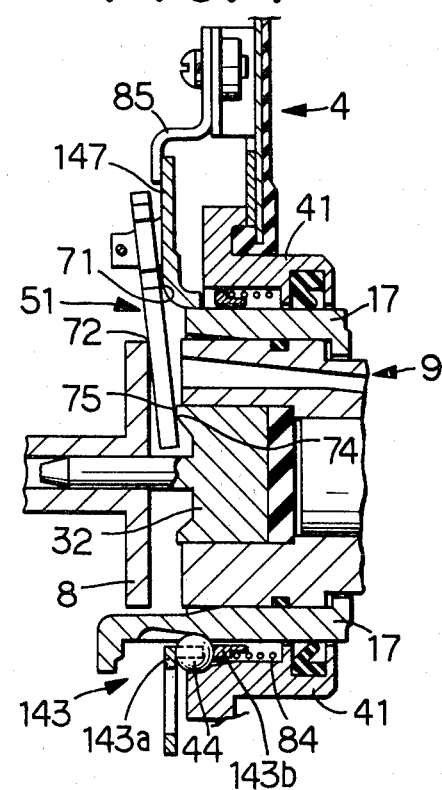
FIG. 7 is an axial section of an essential part of a fourth embodiment of the brake booster.
Figure 8:
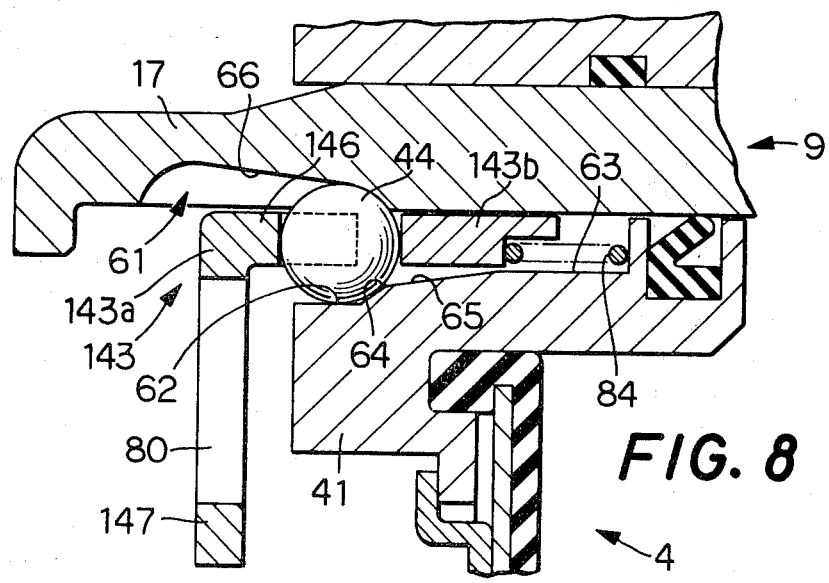
FIG. 8 is an enlargement of an essential part of FIG. 7.

Still another embodiment is illustrated in FIGS. 7 and 8, whose principal feature resides in dividing the ball retainer 143 into two parts, a first member 143a and a second member 143b, the former consisting of a cylindrical portion 146 having three semi-circular notches or recesses with an equal angular interdistance formed on the rear end thereof for retaining three balls 44 and an abutting flange 147 extending outwardly from the front end thereof at right angle, and the latter is of annular form. The ball 44 is retained in the respective semi-circular notch in such a state that a part of the ball is projected from the rear end of the first member 143a. Between the second member 143b and the annular member 41 a compression coil spring 84 is coaxially disposed. With this structure the ball 44 is, due to the resilient force of the compression coil spring 84, tightly sandwiched between the first member 143a and the second member 143b, and all of the first member 143a, the ball 44, and the second member 143b, are equally biased in the forward direction. It is similar to the embodiment illustrated in FIG. 1 that the first member 143a is regulated of its advancing limit by a stopper 85, and other parts are also identical to those in the same embodiment. All of the same parts are allotted the same numerals or signs for omitting superfluous explanation.

In the embodiments shown in FIGS. 2, 5, and 6, there is a space or clearance between the ball retainer 43 and the ball 44 for allowing the ball 44 to move in perpendicular direction to the axis of the control piston, so the power piston 4 has to move a further stroke corresponding to the clearance before the same is locked. In this embodiment, the ball retainer 143 and the ball 44 are constantly contacted with each other by the action of the compression spring 84 leaving no clearance therebetween. The stroke loss of the power piston 4 and the noise from the clearance extinction which conventionally have been complained have been completely eliminated by this invention.

Incidentally, a structure in which the ball is tightly retained without any clearance left by the ball retainer may be varied, not being limited to the style in FIGS. 7 and 8. For example, the second member 143b is omitted in FIG. 9 for allowing the compression coil spring 84 to be directly contacted to the ball 44.

Other parts than the second transmission device composed of the ball and the ball retainer may be notified in various ways.

For example, the slant angle $\alpha$ of the slope surface 66 of the ball accommodating recess 61 may be suitably selected within the range of $0° < \alpha \leq 15°$, the slant angle $\beta$ of the steep slope surface portion 64 may be within the range of $20° \leq \beta \leq 75°$, and that $\gamma$ of the gentle slope surface portion 65 $0° < \gamma \leq 30°$. As to the slope surface 66, the slant angle of the forwardly biased portion thereof may be made larger than that of the rearward portion. As to the relation between the steep slope surface portion 64 and the gentle slope surface portion 65, the essential condition is that the slant angle is smaller or gentler in the rearwardly biased portion than in the rest. It is also permissible to nullify the angled portion at the connecting place of the two slope surface portions (64, 65) by means of making the same into a smoothly curved surface.

As a medium for transmitting the resultant force of the control piston 9 and the valve plunger 22 to the large plunger 32 while permitting the relative movement between the two the above described reaction disc 33 is the best, it may be replaced by levers, etc. An integrated body, as disclosed in U.S. Pat. No. 4,100,839, of the valve plunger 22 and the large plunger 32 may be adopted.

The assisting force to the power piston may be produced by the difference of pressure between the atmospheric pressure and a positive pressure, and also may be produced, as disclosed in U.S. Pat. No. 3,110,031, by the difference of pressure between a chamber constantly set at the atmospheric pressure and another chamber selectively set at the atmospheric pressure or at a negative pressure.

This invention is also applicable to a stroke-enlarging type brake booster disclosed in U.S. Pat. No. 4,242,943 wherein a compression spring is disposed between the power piston and the control piston.

It is to be understood that the invention is not limited to the above-mentioned precise forms, and that modifications and alterations may occur to those skilled in the art.

What is claimed is:

1. A brake booster comprising:
   an input member;
   an output member;
   a power piston disposed in a booster casing in such a manner as to divide an interior of said casing into two chambers so that said power piston may be actuated by a pressure difference in said two chambers, said power piston having a central bore;
   a control piston coupled for axial movement within the central bore of said power piston and having a control valve means for controlling said pressure difference and a first transmission means coupled for transmitting an operational force received by said input member to said output member;
   a reaction lever having a first input portion, and a second input portion, said reaction lever having a central output portion and being coupled to abut said output member at said central output portion, said reaction lever being coupled to receive an output force from said power piston at said first input portion and an output force of said first transmission means at said second input portion wherein said first and second input portions are located on opposite sides of said central output portion, for producing a larger stroke at said output member than the stroke at said input member;
   a second transmission means coupled for axial movement relative to said power piston and control piston, said power piston having an internal surface and said control piston having an external surface spaced from the internal surface of said power piston, said second transmission means being disposed in said space for transmitting said output force of said power piston to said first input portion of said reaction lever;
   stopper means for limiting the relative movement of said second transmission means with respect to said power piston;
   biasing means for biasing said second transmission means against said stopper means with a predetermined resilient force; and
   said second transmission means being constructed and arranged such that it couples said power piston and said control piston in relatively fixed relationship with respect to one another when the reactionary force from said reaction lever exceeds said predetermined resilient force in response to movement of said power piston.

2. The brake booster of claim 1 wherein said second transmission means includes at least one ball and a ball retainer movably retaining said ball in a radial direction and wherein said internal surface of said power piston and said external surface of said control piston are constructed and arranged to form a wedge-shaped space which receives and locks said ball to produce said fixed coupling by said second transmission means.

3. The brake booster of claim 2 wherein said ball retainer is an annular member having a radial bore with a diameter larger than said ball for retaining said ball.

4. The brake booster of claim 2 wherein said ball retainer includes a first member contacting said reaction lever and a second member coupled to receive said resilient force of said biasing means, at least one of said first member and said second member having a recess for retaining said ball for movement in said radial direction and said ball being elastically sandwiched between said first member and said second member by the resilient force of said biasing means.

5. The brake booster of claim 2 wherein said ball retainer includes a recess for retaining said ball therein such that said biasing means is coupled to impart said resilient force to said ball through direct contact with said ball.

6. The brake booster of claim 2 wherein said wedge-shaped space includes a recess formed on each of said internal surface of said power piston and said external surface of said control piston such that the spacing formed by said wedge-shaped space has different widths at one end thereof.

7. The brake booster of claim 6 wherein said recess formed on said internal surface of said power piston is defined by a first surface parallel to the axis of movement of said power piston, a second surface having a slope inclining in a rearward direction from said first surface toward said axis, and a third surface having a slope less than the slope of said second surface and inclining in a rearward direction from said second surface toward said axis.

8. The brake booster of claim 1 wherein said stopper means is a plate coupled to said power piston and arranged to engage said second transmission means.

9. The brake booster of claim 1 wherein said biasing means is a compression coil spring disposed between said second transmission means and said power piston.

10. The brake booster of claim 1 wherein said biasing means is a tension coil spring coupled between said second transmission means and said power piston.

* * * * *